(12) United States Patent
Ala-Laurila et al.

(10) Patent No.: US 6,704,789 B1
(45) Date of Patent: Mar. 9, 2004

(54) SIM BASED AUTHENTICATION MECHANISM FOR DHCPV4/V6 MESSAGES

(75) Inventors: Juha Ala-Laurila, Tampere (FI); Patrik Flykt, Helsinki (FI); Nadarajah Asokan, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/564,635

(22) Filed: May 3, 2000

Related U.S. Application Data

(63) Continuation-in-part of application No. 09/303,423, filed on May 3, 1999.

(51) Int. Cl.[7] .............................................. G06F 15/16
(52) U.S. Cl. ....................... 709/230; 709/230; 709/231; 713/201; 713/202
(58) Field of Search ................................ 713/201, 202; 709/230, 219, 231

(56) References Cited

U.S. PATENT DOCUMENTS

| | | | | |
|---|---|---|---|---|
| 5,884,024 A | * | 3/1999 | Lim et al. ................... | 713/201 |
| 5,922,049 A | * | 7/1999 | Radia et al. ................. | 709/220 |
| 6,032,260 A | * | 2/2000 | Sasmazel et al. ........... | 713/202 |
| 6,061,346 A | * | 5/2000 | Nordman .................... | 370/352 |
| 6,061,796 A | * | 5/2000 | Chen et al. ................. | 713/201 |
| 6,092,196 A | * | 7/2000 | Reiche ........................ | 713/200 |
| 6,137,885 A | * | 10/2000 | Totaro et al. ............... | 380/247 |
| 6,226,751 B1 | * | 5/2001 | Arrow et al. ............... | 713/201 |
| 6,339,830 B1 | * | 1/2002 | See et al. .................... | 713/202 |
| 6,367,009 B1 | * | 4/2002 | Davis et al. ................. | 713/166 |
| 6,373,946 B1 | * | 4/2002 | Johnston ..................... | 380/211 |
| 6,407,988 B1 | * | 6/2002 | Agraharam et al. ......... | 370/328 |
| 6,452,925 B1 | * | 9/2002 | Sistanizadeh et al. ....... | 370/352 |
| 6,463,474 B1 | * | 10/2002 | Fuh et al. ................... | 709/225 |
| 6,510,153 B1 | * | 1/2003 | Inoue et al. ................ | 370/354 |

* cited by examiner

*Primary Examiner*—Saleh Najjar
*Assistant Examiner*—Sahera Halim
(74) *Attorney, Agent, or Firm*—Antonelli, Terry, Stout & Kraus, LLP

(57) ABSTRACT

The invention is a method of providing a user (12) a terminal network address (14) in a first network (16) through which the user communicates with a data network (18) and authenticating connection of the user to the first network. The invention includes transmitting to at least one server in the first network a request to obtain the terminal network address in the first network to provide connection of the user to the data network and an identification of the user in a second network (20) through which the user communicates to the first network; transmitting the identification of the user to the second network; transmitting from the second network to the first network authentication information of the user stored in the second network associated with the identification of the user; transmitting from the first network to the user at least one advertisement of the terminal network address and information within the authentication information; and processing the received at least one advertisement and the received information within the authentication information and determining if the authentication information is correct.

20 Claims, 5 Drawing Sheets

SIM BASED AUTHENTICATION MECHANISM FOR DHCPV4/V6 MESSAGES

CROSS-REFERENCE TO RELATED APPLICATION

This application is a Continuation-in-Part of U.S. Ser. No. 09/303,423, filed May 3, 1999, entitled "SIM Based Authentication Mechanism for DHCPv4/v6 Messages". The subject matter of the parent application is incorporated herein in its entirety.

BACKGROUND OF THE INVENTION

1. Field of the Invention

The present invention relates to methods for authenticating users (terminals in data networks) and the assignment of addresses to terminals which access data networks.

2. Description of the Prior Art

The dynamic host configuration protocol (DHCP) proposes authentication (auth) extension to guarantee that only authorized users have access to a packet data network (IP networks). The service provider network providing connectivity for a user to a packet data network has to authenticate the user (wireless terminal) during the network registration and address allocation procedure. Typically, mobile networks utilize a dynamic addressing scheme which is implemented using the DHCP protocol to connect users to network devices which connect the user to the packet data network. However, it should be understood that utilization of the DHCP protocol is not limited to wireless networks. The DHCPv4 and the DHCPv6 protocols enable dynamic configuration of IP addresses and options and use the User Data Protocol (UDP) as the communication protocol. The network entities utilized in the DHCPv4 and DHCPv6 protocols are the server, the user and an optional relay. The server is the entity that distributes network addresses and information to the users. The optional relay provides forwarding of DHCP messages so that one DHCP server serves many subnetworks instead of one server being assigned to each subnetwork. All communications between the DHCP user and the DHCP server take place utilizing a request-reply style message exchange. All DHCP messages may also contain one or more options (DHCPv4)/extensions (DHCPv6) that carry additional useful parameters between the DHCP user and server.

The communications involved with the DHCPv4 protocol are illustrated in FIG. 1. While not illustrated, an optional relay may be used to forward DHCP messages so that the server serves plural subnetworks. When a DHCPv4 user connects to a network and wishes to acquire an IPv4 address and other work information, it first broadcasts a DHCP discover message to the network in order to discover the presence of any DHCP server which may provide connectivity of the user to a packet data network. The user receives a DHCP offer message from all of the servers that received its DHCP discover message which were configured to answer to the user. The DHCP offer message includes the server's IP address and all other network information which the server assumes the user will need. The user selects the DHCP server whose DHCP offer message is the first one received and discards the rest. The user informs the server whose DHCP offer message was accepted with a DHCP request transmitted to the server to begin the user's use of the IP address. The server acknowledges the request by sending the DHCP acknowledgment to the user which then may start using the assigned IP address.

Whenever the user wants to deallocate its IP address, it sends a DHCP release message to the server. After the DHCP release message, the user may not use the IP address any more. If the user needs to use the address for a longer time than that was specified, the user has to try to renew the use of the assigned IP address. This has to be done no later than when half of the specified time allocated to the user has been used to have the address renewed. The user renews the address by sending a new DHCP request message to the DHCP server. If the server accepts the renewal of the IP address, it sends a DHCP acknowledgment containing new timer values to the user. The server may also deny the renewal of the address by sending a DHCP non-acknowledgment to the user which forces the user to immediately stop using the IP address and revert to an initial state where restarting of the DHCP address acquisition process and authentication begins. If the server does not respond, the user has the option of sending all of the DHCP servers a DHCP request message that includes the user's IP address. Any DHCP server that is configured to provide the IP address to the user may either renew the address by sending a DHCP acknowledgment or deny the address with a DHCP non-acknowledgment. If no replies are sent, the user stops using the IP address when the timer expires and has thereafter to restart the DHCP protocol from the initial state.

The communications involved with the DHCPv6 protocol are illustrated in FIG. 2. When a user contacts the network, it will first generate a link-local IPv6 address according to the rules of stateless auto configuration as described in RFC 2462 which specifications are incorporated herein by reference in their entirety. Thereafter, the user will receive a router advertisement and if the router advertisement tells the user to use stateful auto configuration, (i.e. DHCPv6), the user will send a DHCP solicit message to all DHCP agents multicast address to obtain one or more DHCP server addresses. The solicit message may be forwarded by a DHCP relay to the all-DHCP-server multicast address of another network. If the user has been preconfigured with the IP address of a server or a relay and the server or relay is on the same network link as the user, the user may skip the solicit message and select the DHCP protocol with the request message. A DHCP server receiving the solicit message will respond with DHCP advertisement message to inform the user about the server. The advertisement message contains a preference field that informs how interested the server is in serving the particular user. If the user and the server are on the same link, the server replies directly to the user, otherwise, the advertised message is sent by the same DHCP relay that forwarded the solicit message to the server.

The user waits a predefined amount of time so that it has a chance to receive the DHCP advertisement messages from different servers. The DHCP user makes the selection between the DHCP servers based on the preference value by selecting the server that specifies the highest value of interest. If the user receives an advertisement message with the maximum preference value of 255, it may select the respective server immediately and ignore any later received advertisement messages.

The user sends a DHCP address request message to the server it selected in order to request the network configuration parameters from the server. The user requests these parameters by adding an extension concerning those parameters to the request message. By setting the 'C' bit field in the request message, the user may request a deallocation of its resources except those explicitly listed in the extensions. By setting the 'R' bit field, the user requests a deallocation of all of the resources it had previously required. These deallocation requests are very useful when a user restarts because the user may have lost some or all of its previous state in the restarting process. The request message contains a transaction ID field which is a monotonically increasing unsigned integer number that is used to identify the request message and combines it with the DHCP reply.

The server sends one DHCP reply message in response to every received DHCP request message. The reply message carries all the important network information as message extensions which provides flexibility to information exchange. The transaction ID field is copied from the request message in order to associate the reply message with the correct request.

Whenever the DHCP user wants to deallocate some parameters it has received, it may do so by sending a DHCP release message directly to the server. The parameters that are to be released are listed as extensions. A release message without extension causes the server to release all the resources the user has acquired. Releasing parameters using the release message is preferable to the aforementioned 'C' and 'R' bit fields in the request message which should only be used for cleaning up user parameters at start time.

Servers may notify the users that some of their parameters need to be updated by sending a DHCP reconfigure message. The parameters which are present in the reconfigured messages extensions have to be reacquired by the user. In order to receive the new parameters, the user sends a new request message to the server which then responds with a reply message containing the parameters. See "Dynamic Host Configuration Protocol For IPv6 (DHCPv6) Work in Progress DHCP Working Group 1998", J. Bound and C. Perkins and "Extensions for the Dynamic Host Configuration Protocol for IPv6 Work in Progress 1998", by C. Perkins which publications are incorporated herein by reference in their entirety.

The GSM (Global System for Mobile Communications) telephone system uses algorithms in the mobile user units and in the network servers which control authentication of the user to prevent unauthorized access to the network and to provide encryption of the transmissions between the terminal and networks. The GSM System is described in depth in the publication, "The GSM System for Mobile Communications" by Mouly and Pautet, Copyright 1992, which publication is incorporated herein by reference in its entirety. Authentication in a GSM network is performed by the generation of a signed response SRES by both the user mobile and the network which is a function of a unique secret identifier Ki of the user mobile and a random number RAND. The signed response SRES is calculated in the subscriber identification module (SIM) based upon Ki stored inside SIM and a random number RAND obtained from the network authentication center (AuC). Additionally, the user mobile and the network each perform encryption by generating a key Kc, which is a function of the same random number RAND and the secret identifier Ki of the mobile. The first authentication algorithm, which calculates SRES, is known as the A3 algorithm and the second algorithm, which computes Kc, which is computed each time a user mobile is authenticated, is known as the A8. However, each of the operations of authentication and computing of the ciphering key Kc requires the mobile to be programmed to perform the aforementioned computations and the secret algorithm stored in SIM.

SUMMARY OF THE INVENTION

The present invention is a method by which a user utilizes a single mechanism for the dual functions of obtaining an IP address in a data network, which preferably is a packet data network or a wireless LAN network and authentication in the network providing connectivity to the data network. The authentication mechanism in a first embodiment utilizes a user identification stored in a second network providing connectivity between the user and the first network which may be obtained from a smart card in the user terminal. Alternatively, in second and third embodiments, the authentication mechanism uses a user identification stored in the first network. The user identification in the second and third embodiments, like the first embodiment, may be obtained from a smart card in the user terminal. The invention permits a wireless data network to authenticate the user using the user's telephone authentication information. The invention permits telephone networks to sell internet service provider (ISP) network access to customers and handle all billing in a telephony bill. In this situation, the ISP operator provides a gateway and the user's authentication is relayed to the telephone network which is the manner in which cellular (for example, GSM) authentication is adapted to data networks. Utilization of a smart card approach which, in a preferred embodiment, uses SIM for authentication and billing, which also handles charges for packet data network access.

The use of the smart card permits the mapping of a telephone interface into a wireless IP network terminal and to charge wireless internet services to the telephone bill. A user entering a wireless internet office may utilize their smart card used in the telephone terminal and insert the smart card into a WLAN terminal. This permits evolution from telephone based services to WLAN based wireless internet services while maintaining interworking with the telephone operator. Similarly, the use of the smart card may be integrated into data network authentication with a single bill being used for both data and telephone services.

The present invention is a method of providing a user a terminal network address in a first network through which the user communicates with a data network, which preferably is a packet data network such as internet/intranet core, and authenticating connection of the user to the first network. A request is transmitted to at least one server in the first network to obtain the terminal network address in the first network which provides connection of the user to the data network and an identification of the user in the second network. In a first embodiment, the identification of the user is transmitted to the second network and authentication information of the user stored in the second network associated with the identification of the user is calculated using a user identification obtained from a user terminal smart card and transmitted from the second network to the first network. In second and third embodiments, the identification of the user and authentication information, which is the user's profile in the second network, is stored in the first network. At least one advertisement of the terminal network address and information within the authentication information is transmitted from the first network to the user. The received at least one advertisement and the received information within the authentication information is processed and a determination is made if the authentication information is correct. A request message is transmitted from the user to the first network which selects a server to provide connection of the user to the data network and which requests configuration parameters of the first network, and authentication which is a function of a ciphering key and a signed response, which is a function of a secret parameter associated with a user and a random number contained in the received authentication information. A determination is made with the first network if the signed response is correct and if the signed response is correct, a reply to the user with the configuration parameters of the first network and an acknowledgment which is a function of the ciphering key is made. After the reply with the acknowledgment, which is a function of a ciphering key, communications between the user and the network are transmitted which may be authenticated with the ciphering key. In a preferred embodiment, the second network is a wireless network. The authentication information comprises a random number RAND, a signed response SRES which is a function of the random number, and a secret identifier of the user and the ciphering key Kc. Each transmitted communication, after authentication is complete, may contain an IPSEC authentication header or alternatively, may be encrypted and/or authenticated by encapsulating security payload (ESP). Authentication of the user in the first network is performed before providing the user with a terminal network address and typically before allowing the user access to the packet data network. When the second network stores the authentication information, a preferred storage is a register which stores information of the location of the mobile in the wireless network or using any alternative authentication encryption mechanism, e.g. radio link level security functions.

BRIEF DESCRIPTION OF THE DRAWINGS

Like parts and terminology are identified identically throughout the drawings.

DESCRIPTION OF THE PREFERRED EMBODIMENTS

Figure 3A:
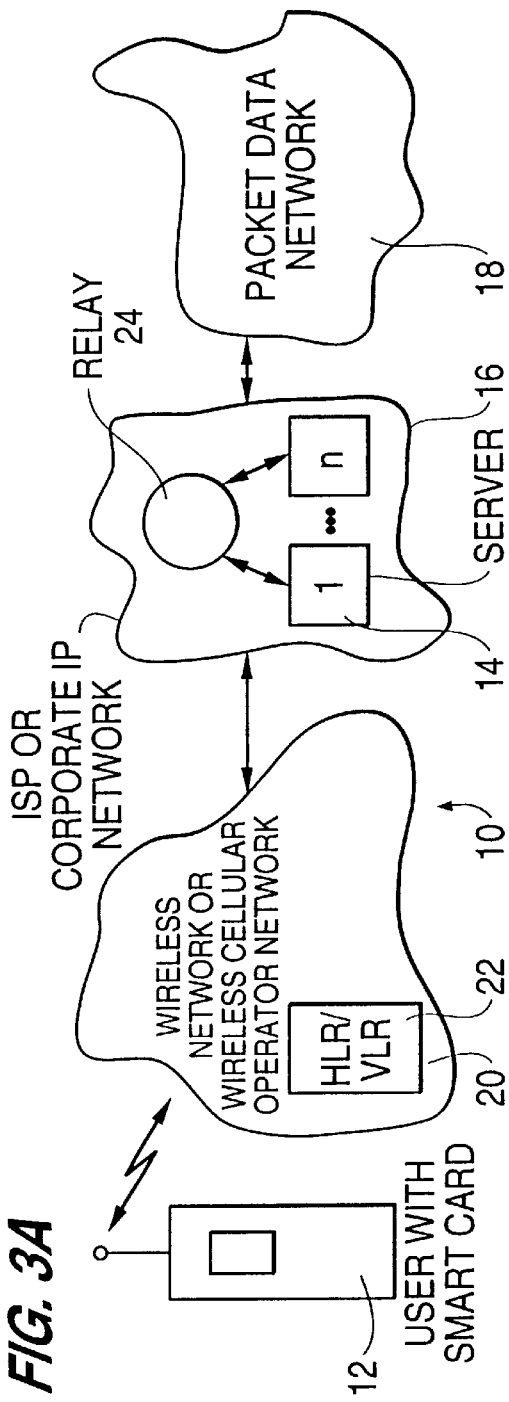
FIG. 3A illustrates a first exemplary network architecture and FIG. 3B illustrates a second exemplary network architecture in which the present invention may be practiced.
Figure 3B:
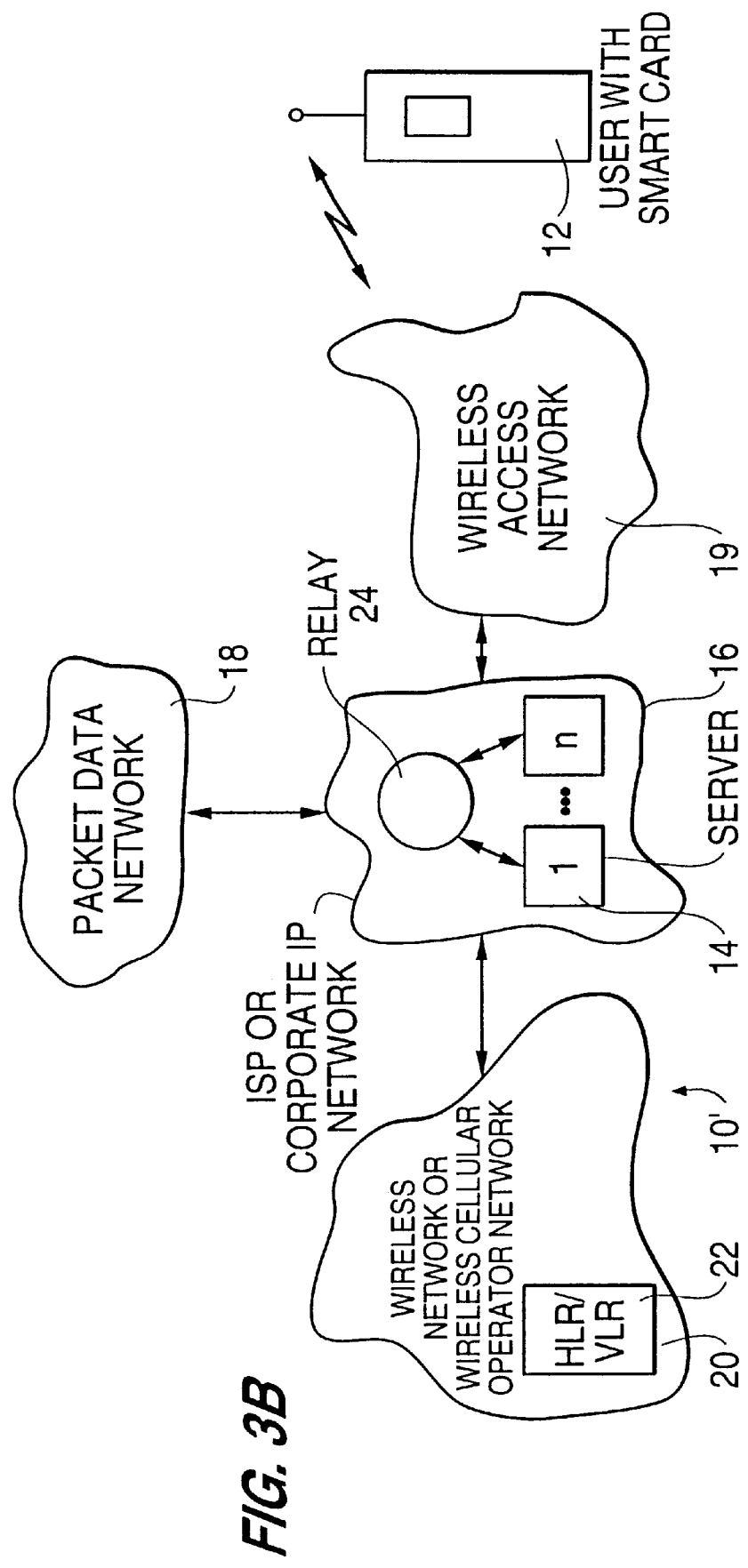

FIGS. 3A and 3B illustrate exemplary network architectures 10 and 10' in which the method of the invention is practiced providing a user terminal 12, including a smart card, a terminal network address provided by a server 14 in a first network 16 through which the user communicates with a data network, which preferably is a packet data network 18, and authenticates connection of the user to the first network.

The smart card associated with the user terminal 12, which may be of diverse designs, provides the user identification (USER ID) as described below in conjunction with FIGS. 4–6 and may be without limitation IMSI or NAI (Network Access Identifier) in accordance with RFC 2486. In a preferred embodiment, the smart card may calculate SIM to provide the USER ID but the invention is not limited thereto.

An example of the user terminal 12 is a terminal which is a smart card controlled mobile station having a master control unit, a user interface,sa RF high frequency part, an audio low frequency part, a user interface, a power unit, a data transfer and an application module connection unit. The terminal is controlled by the master control unit with control programs stored therein. The user interface has a display, keypad and status indicators. The master control unit produces various situation specific messages, operation instructions, and menu's on the display. A user enters information by the keypad, such as the terminal identification number, telephone number and select operations from the menus. The status indicators can preferably be used to indicate internal modes of operation of the terminal. The RF high frequency part is part of a conventional mobile phone which is used to transmit and receive calls and messages using radio frequencies in a radio communication network such as a GSM network, e.g. through a mobile services switching center. The audio frequency part includes a microphone, a headphone and a buzzer.

The operation power for the terminal is supplied by a chargeable battery. A power unit monitors the charge station and charging of the battery. The power unit signals the master control unit when the charge status of the battery falls below a predetermined value.

A smart card is connected to a module and connector located in the terminal. The smart card provides an identification of the user (USER ID such as, but not limited to, IMSI or NAI) with one form of the smart card implementation without limitation being SIM. The connection of the smart card during use provides the USER ID to the user terminal 12 for purposes of providing the USER ID during authentication as described below.

It should be understood that the network architectures 10 and 10' are only suggestive of diverse network architectures in which the present invention may be practiced. The connectivity of the user terminal 12 is illustrated directly in the first embodiment 10 to a second network 20 having a home location register/visiting/business location register 22, which is well known in cellular technology, such as the GSM system. However, the invention is not limited to wireless connectivity between the user terminal and the first network 16 with connectivity in the second architectures 10' of FIG. 3B between the user terminal 12 and the packet data network 18 being through an intermediate wireless access network 19 and the first network 16 being one alternative. The first network preferably is an ISP or corporate IP network. Furthermore, the user 12 may be part of a wireless access network as illustrated in FIG. 3B. The relay 24 in the first network 16 corresponds to the relay described above regarding the prior art and is optional in the practice of the present invention.

As used herein, the term "user" means any communication terminal including any associated computer, modem, etc., which communicates with the data network 18, mobile terminal, wireless IP terminal or other network connectible terminal.

Figure 2:
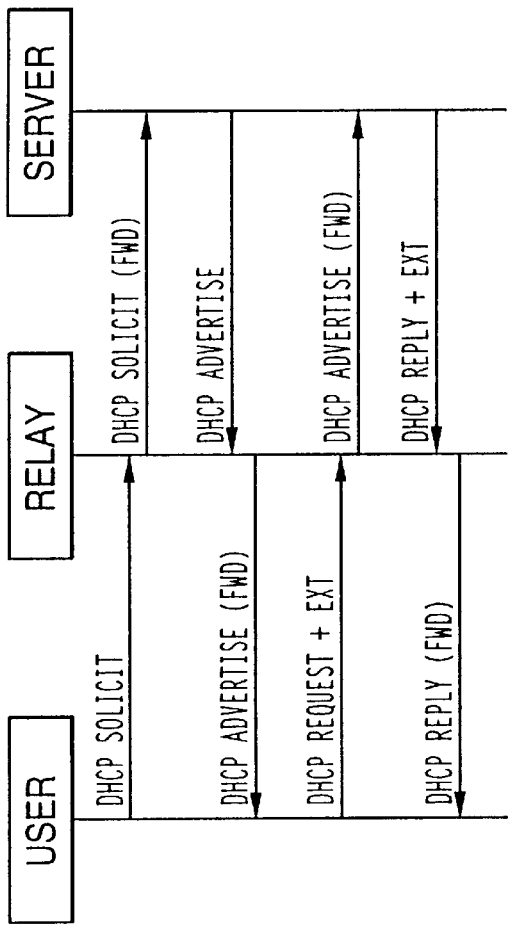
FIG. 2 is a diagram illustrating the operation of the prior art DHCPv6 protocol.
Figure 4:
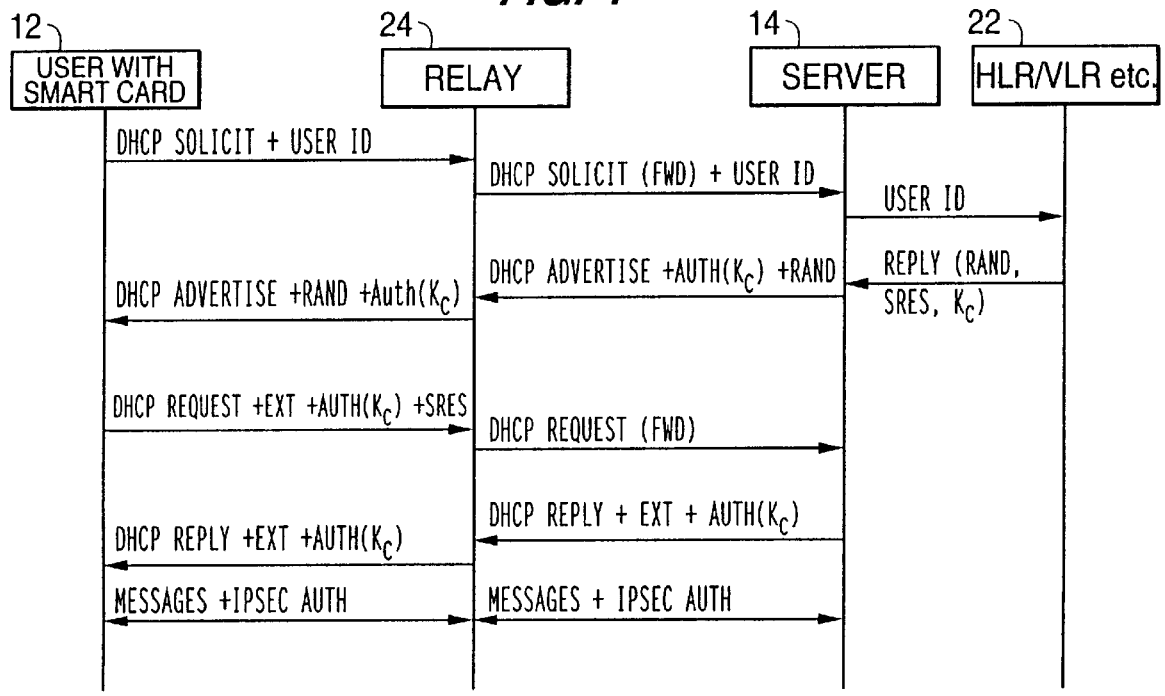
FIG. 4 illustrates a modification of the DHCPv6 protocol in which a first embodiment of the present invention is practiced.

FIG. 4 illustrates a first embodiment of a method in accordance with the present invention which is practiced with a modification of the DHCPv6 protocol. However, it should be understood that the invention is not limited thereto. The sequence of communications described as prior art in the description of the DHCPv6 protocol in FIG. 2, which are common to the first embodiment, perform the same functions as in the prior art and will not be repeated herein. Furthermore, as illustrated in FIG. 4, while a preferred storage for authentication information regarding the user, which is calculated using the USER ID obtained from a user terminal smart card, is in a HLR/VLR register 22, which is well known in wireless systems such as the GSM system, the authentication information of the user may alternatively be stored in the server 14. When the user authentication information is stored in the server 14, it is not necessary to transfer the user authentication information from the second network 20 to obtain connectivity to the network 18, in view of the authentication information being on hand in the first network 16 at the time the address and authentication solicitation begins. When the authentication information is stored by server 14, the USER ID (e.g. IMSI or NAI) is used to locate in the server the authentication information.

In the operation of the first embodiment illustrated in FIG. 4, operation begins at the top left-hand corner at the user 12 and terminates at the bottom right-hand corner between which bidirectional messages plus any IPSEC authentication are transmitted between the user 12 and the server 14. The user 12 transmits a USER ID through optional relay 24 to server 14 which forwards the USER ID to the HLR/VLR register 22 of the wireless network 20. The HLR/VLR register 22 uses the USER ID to generate a random number RAND, a signed response SRES, and the ciphering key Kc, which are identified in the HLR/VLR register by the USER ID and replies by sending this information to the server 14. The RAND, SRES and Kc are identical to their use in the GSM telephone system. The invention is not limited to user authentication information being identical to that used in the GSM system. By performing authentication at this time, the authentication process is completed by the first network 16 before a server 14 offers to provide a terminal network address to the user 12 and access to the packet data network 18. This sequence avoids servers 14 offering to provide a terminal network address before the user 12 is authenticated which is a more efficient use of network assets. The server 14 transmits an authentication which has been calculated using the key Kc and the random number RAND via optional relay 24 to the user 12. The user 12 uses the smart card resident therein, which preferably contains a SIM identical to that used in the GSM telephone system, which processes the received RAND to produce SRES. The user 12 checks the calculated SRES for authentication with the smart card and if a match is found, the assigned DHCP advertised address is validated. If the authentication information is correct, the user 12 sends a request message that contains the SRES and an authentication performed with the key Kc to the server 14 via relay 24. If the authentication of the request is correct, the server 14 replies with a reply message authenticated with the key Kc. Subsequent messages between the user and the server are also authenticated using the key Kc as indicated by bidirectional "messages+ IPSEC authentication", which provides additional authentication of each message. This task is performed by placing an IPSEC header in each message to take advantage of the IPSEC protocol authentication. Alternatively, messages may be encrypted and/or authenticated by the ESP or by link specific functions like GSM.

The USER ID and RAND, SRES and Kc authentication information requires separate options/extensions fields where the information is contained in the DHCPv6 protocol. The smart card user identification information may, for example, be sent in platform-specific extensions. The platform-specific extension is identified to carry smart card user identification information or authentication information by using a platform class identifier extension with a suitable identification value. The current version of the DHCPv6 doesn't specify particular extensions for the solicit message which requires modification of the current form of DHCPv6, as described above, to allow extensions for the solicit message or, alternatively, to create a new DHCPv6 destination option. The authentication information uses the default identification extension and optionally, the default authentication algorithm defined for DHCPv6 using Kc as the shared secret. If maintaining security is of high importance, Kc may be transformed by a hash function with the hash value being used instead of the key Kc in order to maintain secrecy of the key Kc. Authenticating the offer/advertised messages is useful in prohibiting malicious hosts posing as users or servers and thereby falsifying the information sent to the users and servers.

Figure 1:
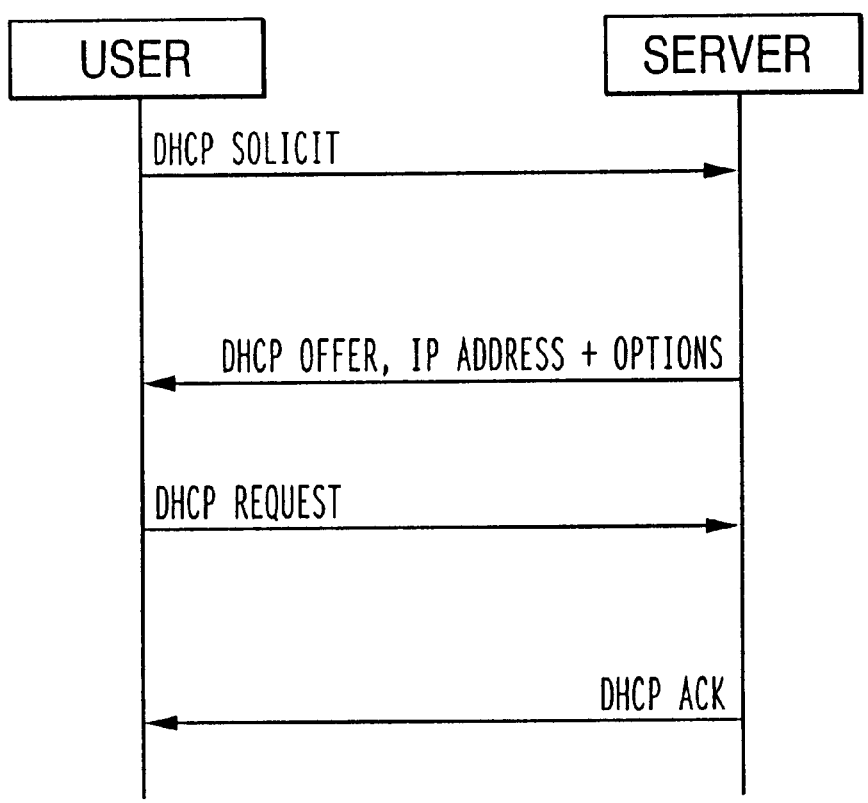
FIG. 1 is a diagram illustrating the operation of the prior art DHCPv4 protocol.
Figure 5:
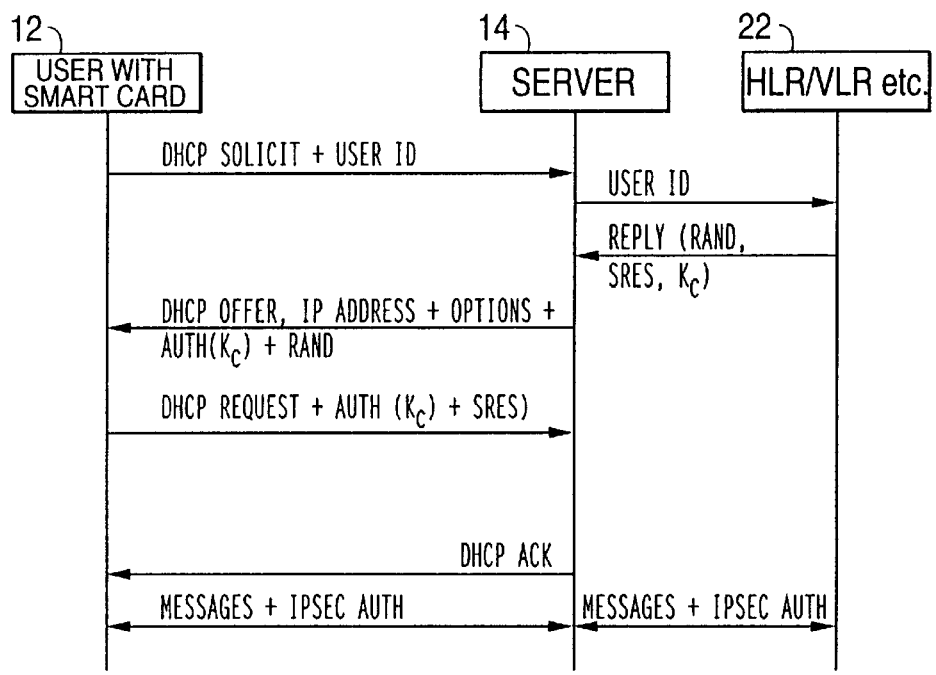
FIG. 5 illustrates a modification of the DHCPv4 protocol in which a second embodiment of the present invention is practiced.

FIG. 5 illustrates a second embodiment of the method of the present invention modifying the DHCPv4 protocol as described above as prior art in conjunction with FIG. 1. A relay may optionally be used in FIG. 5 which performs the same function as the relay of FIG. 4. FIG. 5 is similar to FIG. 4 regarding the information which has been added to the DHCPv4 protocol which is described as prior art and is not discussed further hereinafter.

When mapping an authentication model to DHCP message, there may not be enough messages in a single DHCP protocol round to carry all of the required signalling. What needs to be sent is the user ID, a RAND generated from the user ID, a SRES in response to the RAND and finally a message stating the outcome of the authorization communications. The last message that states the outcome of the authorization protocol is embedded implicitly in a DHCP acknowledgment or non-acknowledgment or message so that both the DHCP protocol and the authorization protocol are kept in synchronization with each other. The actual authentication messages passed between the user and the DHCP server have been discussed above.

Figure 6:
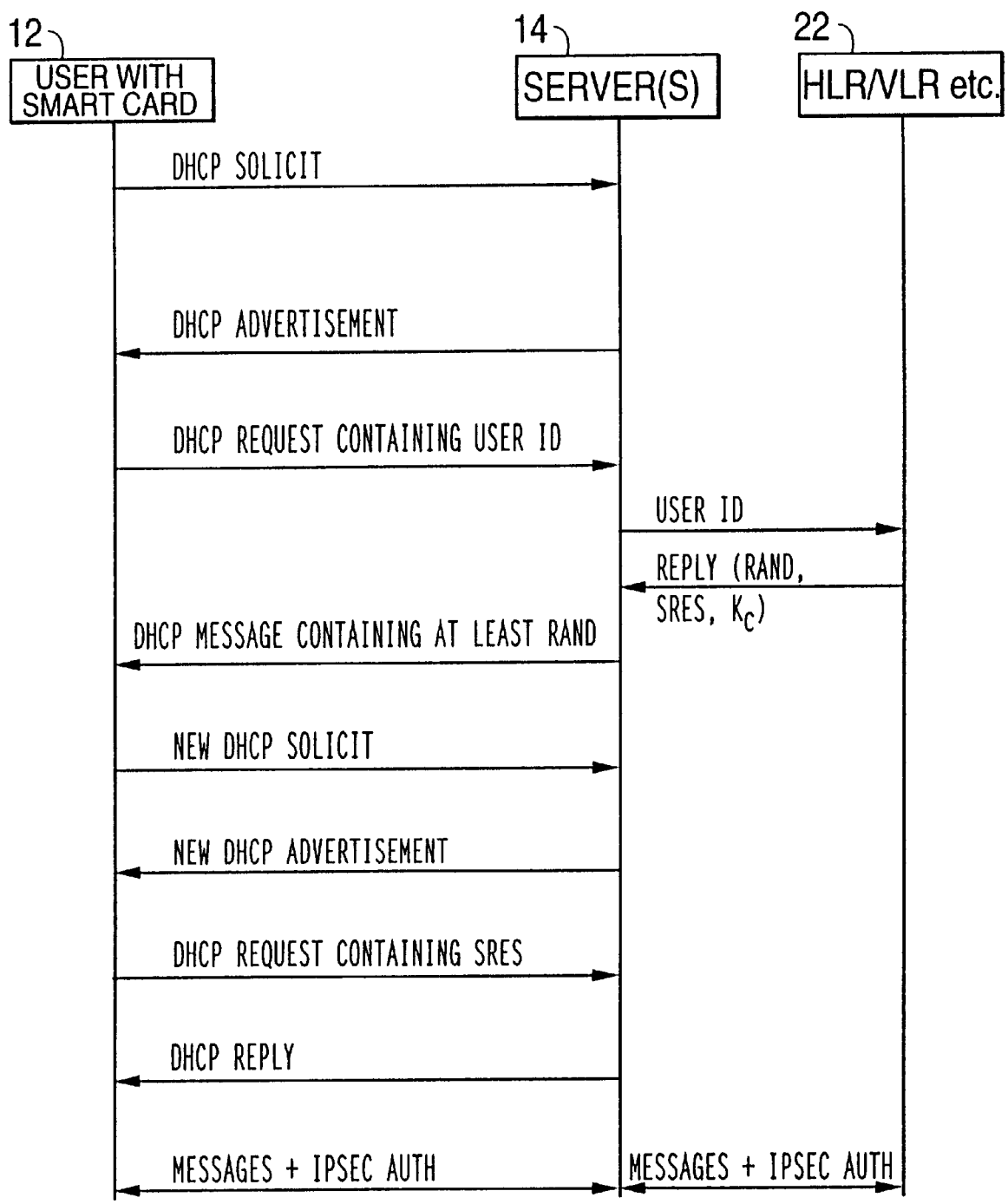
FIG. 6 illustrates a modification of the DHCPv4 protocol in which a third embodiment of the present invention is practiced.

A third embodiment of the invention illustrated in FIG. 6 which is a modification of the embodiment of FIG. 5, involves the transmission of authentication information using the following communications in multiple DHCP protocol rounds:
1. The user 12 sends a DHCP solicit message.
2. The DHCP server(s) 14 send DHCP advertisement messages.
3. The user 12 sends user identification information in a DHCP request message to a selected DHCP server 14.
4. The selected DHCP server 14 sends the user ID to the HLR/VLR 22 and the HLR/VLR replies with a RAND, SRES and $K_c$ to the selected server.
5. The selected DHCP server 14 sends the RAND, SRES and $K_c$ to the user 12 in a DHCP message.
6. The user 12 sends a new DHCP solicit message.
7. The selected DHCP server 14 sends a new DHCP advertisement message.
8. The user 12 selects the same server 14 as in step 3 above and sends SRES information in each DHCP request message to another DHCP server.
9. The DHCP server sends an DHCP reply message.
10. Messages and IPSEC authentication are sent between the user 12, servers 14 and HLR/VLR 22.

With the third embodiment, it is possible to send a public key, nonces, etc. in step 2 from the DHCP server to the user prior to sending the user identification in step 3. However, it also becomes more difficult, if not impossible without modifications to the protocol code, to select the same DHCP server in step 8 as in step 3. Modifying the DHCP protocol code in both the user and DHCP server will increase the complexity of the DHCP protocol states. Messages, especially in steps 2, 3, 7 and 8, can get lost so that the same DHCP server cannot be contacted twice. However, steps 6 and 7 may be omitted, thereby decreasing a possibility of losing a message. These steps can be omitted for example if step 4 includes a reason for the denial, which in this case could be a special "authentication failed" option or implicitly derived from the other attached options. On the other hand, only one DHCP server may be used in a subnetwork, but this has the drawback of reducing scalability.

The DHCP messages containing the SIM authorization messages should be authenticated with a symmetric or asymmetric key so that the DHCP server knows which SIM authorization belongs to which user in order to prevent an outsider from copying a valid SIM authentication information into the DHCP messages.

Unlike a DHCPv6 server, the DHCPv4 server is not able to demand a re-registration from the user. Therefore, the lifetime of the authentication/authorization and the length of the DHCP lease time have to be selected in conjunction with each other. Since one outcome of the authentication is the possibility of creating new keys as well, no keys have to be distributed between the DHCP server and the user. The keys used in authenticating DHCP messages need not be changed during the lease if it is assumed that the user will not be renewing its lease infinitely. However, there may be keys in use for other purposes such as authenticating each communication between the user and a security gateway. This means that a lifetime value has to be communicated between the DHCP server and the user when the authentication procedure takes place. The lifetime should be selected as a multiple of the lease lifetime taking into account the values of the lease timeout timers. When the lifetime is going to end before the next re-registration, the user includes its NAI in the re-registration message which triggers the authentication procedure.

The use of a smart card in both embodiments permits dynamic authentication and user identity management.

The present invention facilitates products involving WLAN networks by providing a WLAN terminal having a reliable, easy and flexible authentication, authorization and a billing model for ISP's and private enterprises. The use of smart cards to implement SIM adds value as a consequence of permitting an easy and secure way to distribute the necessary secret key to the users in order to calculate SIM.

The use of smart cards to provide SIM has a three-fold advantage. First, smart cards are tangible. Second, the same smart card may contain multiple value added applications, in addition to SIM, such as electronic cash. Third, the smart card supports electronic signatures. The first benefit is important for corporate information technology departments and ISP's in providing the user with an inability to duplicate the user's identity. The second benefit allows operators to provide users with multiple function cards which can deploy electronic cash paying for network services. Third, electronic signatures provide a method for authentication which is applicable to future wireless office applications.

While the invention has been described in terms of its preferred embodiments, it should be understood that numerous modifications may be made thereto without departing from the spirit and scope of the invention as defined in the appended claims. It is intended that all such modifications fall within the scope of the appended claims.

What is claimed is:

1. A method of providing a user a terminal network address in a first network through which the user communicates with a packet data network and authenticating connection of the user to the first network comprising:

transmitting to at least one server in the first network a request to obtain the terminal network address in the first network which provides connection of the user to the packet data network;

transmitting from the first network to the user at least one advertisement of the terminal network address;

transmitting an identification of the user in a wireless second network through which the user communicates to the first network to the at least one server;

transmitting to the user information within authentication information stored in the first network which is identified by the identification of the user; and the user processes the received at least one advertisement and the received information within the authentication information and determines if the authentication information is correct.

2. A method of providing a user a terminal network address in a first network through which the user communicates with a data network and authenticating connection of the user to the first network comprising:

transmitting to at least one server in the first network a request to obtain the terminal network address in the first network which provides connection of the user to the data network and an identification of the user in a wireless second network through which the user communicates to the first network;

transmitting the identification of the user to the wireless second network;

transmitting from the wireless second network to the first network authentication information of the user stored in the wireless second network associated with the identification of the user;

transmitting from the first network to the user at least one advertisement of the terminal network address and information within the authentication information; and processing the received at least one advertisement and the received information within the authentication information and determining if the authentication information is correct.

3. A method in accordance with claim 2 further comprising:

transmitting a request message from the user to the first network which selects a server to provide connection of the user to the data network and which requests configuration parameters of the first network, an authentication and a signed response which is a function of a secret parameter associated with the user and a random number contained in the received authentication information.

4. A method in accordance with claim 3 further comprising:

determining with the first network if the signed response is correct and if the signed response is correct replying to the user with configuration parameters of the first network and an acknowledgment which is a function of a ciphering key; and wherein the authentication transmitted to the first network is a function of the ciphering key.

5. A method in accordance with claim 4 wherein:

after the reply with the acknowledgment, which is a function of the ciphering key, transmitting communications between the user and the first network, which are authenticated with the ciphering key.

6. A method in accordance with claim 5 wherein:

each transmitted communication contains an IPSEC authentication header.

7. A method in accordance with claim 5 wherein:

each transmitted communication is encrypted and/or authenticated with an encapsulating security payload.

8. A method in accordance with claim 2 wherein:

the authentication information comprises a random number RAND, a signed response SRES, which is a function of the random number, and a secret identifier of the user and a ciphering key Kc.

9. A method in accordance with claim 2 wherein:

authentication of the user in the first network is performed before providing the user with the terminal network address.

10. A method in accordance with claim 2 wherein:

the authentication information is stored in the second wireless network in a register which stores information of the location of a user mobile in the second wireless network.

11. A method in accordance with claim 2 wherein:

the data network is a packet data network.

12. A method in accordance with claim 2 wherein:

the user is in the second wireless network which is an access network.

13. A method in accordance with claim 12 further comprising:

transmitting a request message from the user to the first network which selects a server to provide connection of the user to the packet data network and which requests configuration parameters of the first network, an authentication and a signed response which is a function of a secret parameter associated with the user and a random number contained in the received authentication information.

14. A method in accordance with claim 13 further comprising:

determining with the first network if the signed response is correct and if the signed response is correct replying to the user with configuration parameters of the first network and an acknowledgment which is a function of a ciphering key; and wherein
the authentication transmitted to the first network is a function of the ciphering key.

15. A method in accordance with claim 14 wherein:

after the reply with the acknowledgment, which is a function of the ciphering key, transmitting communications between the user and the first network, which are authenticated with the ciphering key.

16. A method in accordance with claim 15 wherein:

each transmitted communication contains an IPSEC authentication header.

17. A method in accordance with claim 15, wherein:

each transmitted communication is encrypted and/or authenticated with an encapsulating security payload.

18. A method in accordance with claim 2 wherein:

the user is in the second wireless network which is an access network.

19. A method of providing a user a terminal network address in a first network through which the user communicates with a packet data network and authenticating connection of the user to the first network comprising:

transmitting to at least one server in the first network a request to obtain the terminal network address in the first network which provides connection of the user to the packet data network and an identification of the user in a wireless second network through which the user communicates to the first network;

transmitting from the first network to the user at least one advertisement of the terminal network address and information within authentication information stored in the first network which is identified by the identification of the user; and processing the received at least one advertisement and the received information within the authentication information and determining if the authentication information is correct.

20. A method in accordance with claim 19 wherein:

the authentication information comprises a random number RAND, a signed response SRES which is a function of the random number, and a secret identifier of the user and a ciphering key Kc.

* * * * *